United States Patent
Walquist et al.

(10) Patent No.: US 8,573,545 B2
(45) Date of Patent: Nov. 5, 2013

(54) MOUNTING BRACKET MEANS FOR SOLAR ARRAYS AND THE LIKE

(75) Inventors: Steven D. Walquist, Cedar City, UT (US); Sterling C. Holmes, Cedar City, UT (US)

(73) Assignee: Holm-quist Designs LLC, Cedar City, UT (US)

( * ) Notice: Subject to any disclaimer, the term of this patent is extended or adjusted under 35 U.S.C. 154(b) by 168 days.

(21) Appl. No.: 13/190,206

(22) Filed: Jul. 25, 2011

(65) Prior Publication Data

US 2013/0026308 A1   Jan. 31, 2013

(51) Int. Cl.
- A47F 5/00 (2006.01)
- A47F 7/00 (2006.01)
- F16M 11/00 (2006.01)
- F16M 13/00 (2006.01)

(52) U.S. Cl.
USPC ........ 248/122.1; 248/133; 248/139; 248/371; 52/93.1; 52/93.2

(58) Field of Classification Search
USPC ........... 248/122.1, 121, 125.9, 133, 139, 371, 248/177.1, 178.1, 218.4, 219.1, 219.2, 248/219.3, 219.4, 534, 548, 511, 514; 52/93.1, 93.2, 713, 655.1, 173.3, 460, 52/464, 467, 468, 506.06, 220.3, 480, 52/483.1, 668, 669, 200
See application file for complete search history.

(56) References Cited

U.S. PATENT DOCUMENTS

| | | | |
|---|---|---|---|
| 3,313,513 A * | 4/1967 | Howell ...................... | 248/441.1 |
| 3,802,653 A | 4/1974 | Nyulassie | |
| 3,874,623 A * | 4/1975 | Moulton ...................... | 248/121 |
| 4,496,123 A * | 1/1985 | Laramie ...................... | 248/121 |
| 4,706,921 A | 11/1987 | Paulin | |
| 4,924,648 A * | 5/1990 | Gilb et al. ...................... | 52/295 |
| 5,157,882 A * | 10/1992 | Soble ............................... | 52/298 |
| 5,307,603 A * | 5/1994 | Chiodo ........................... | 52/698 |
| 5,467,569 A * | 11/1995 | Chiodo ........................... | 52/713 |
| 5,575,130 A * | 11/1996 | Chiodo ........................... | 52/713 |
| 5,671,579 A * | 9/1997 | Miranda Camino et al. ............................. | 52/653.1 |
| 5,671,580 A * | 9/1997 | Chou ........................... | 52/656.4 |
| 6,508,036 B1 | 1/2003 | Sandy et al. | |
| 7,419,171 B1 * | 9/2008 | Ka Ming .................. | 280/87.041 |
| 7,793,476 B2 * | 9/2010 | Sanders et al. .................. | 52/296 |
| 8,052,100 B2 * | 11/2011 | Zante et al. ................. | 248/122.1 |
| 2008/0012750 A1 | 1/2008 | Austin et al. | |
| 2010/0059045 A1 | 3/2010 | Guinea Diaz et al. | |
| 2010/0139645 A1 | 6/2010 | Whipple et al. | |
| 2010/0139646 A1 * | 6/2010 | Barsun et al. ................. | 126/600 |
| 2011/0173900 A1 * | 7/2011 | Plaisted et al. ..................... | 52/97 |
| 2011/0280649 A1 * | 11/2011 | Dewson et al. ............... | 403/171 |
| 2013/0028657 A1 * | 1/2013 | Kenho .......................... | 403/188 |

* cited by examiner

*Primary Examiner* — Nkeisha Smith
(74) *Attorney, Agent, or Firm* — Lawrence E. Laubscher, Sr.; Lawrence E. Laubscher, Jr.

(57) ABSTRACT

A mounting bracket arrangement for fastening a solar array to a vertical support pipe, including a generally horizontal support disk seated transversely across the pipe end to close the interior thereof, and a pair of parallel vertical bracket plates having corresponding lower edge portions each containing pairs of parallel vertical slots that define a center section and a pair of side sections. The vertical bracket plates are arranged normal to the horizontal support plate such that the center sections extend into the pipe interior via horizontal linear openings contained in the horizontal plate, and the side sections extend longitudinally externally of the horizontal support plate for connection by external fastener devices. The solar array is pivotally connected between the upper portions of the vertical bracket plates for angular adjustment relative to the support pipe.

6 Claims, 3 Drawing Sheets

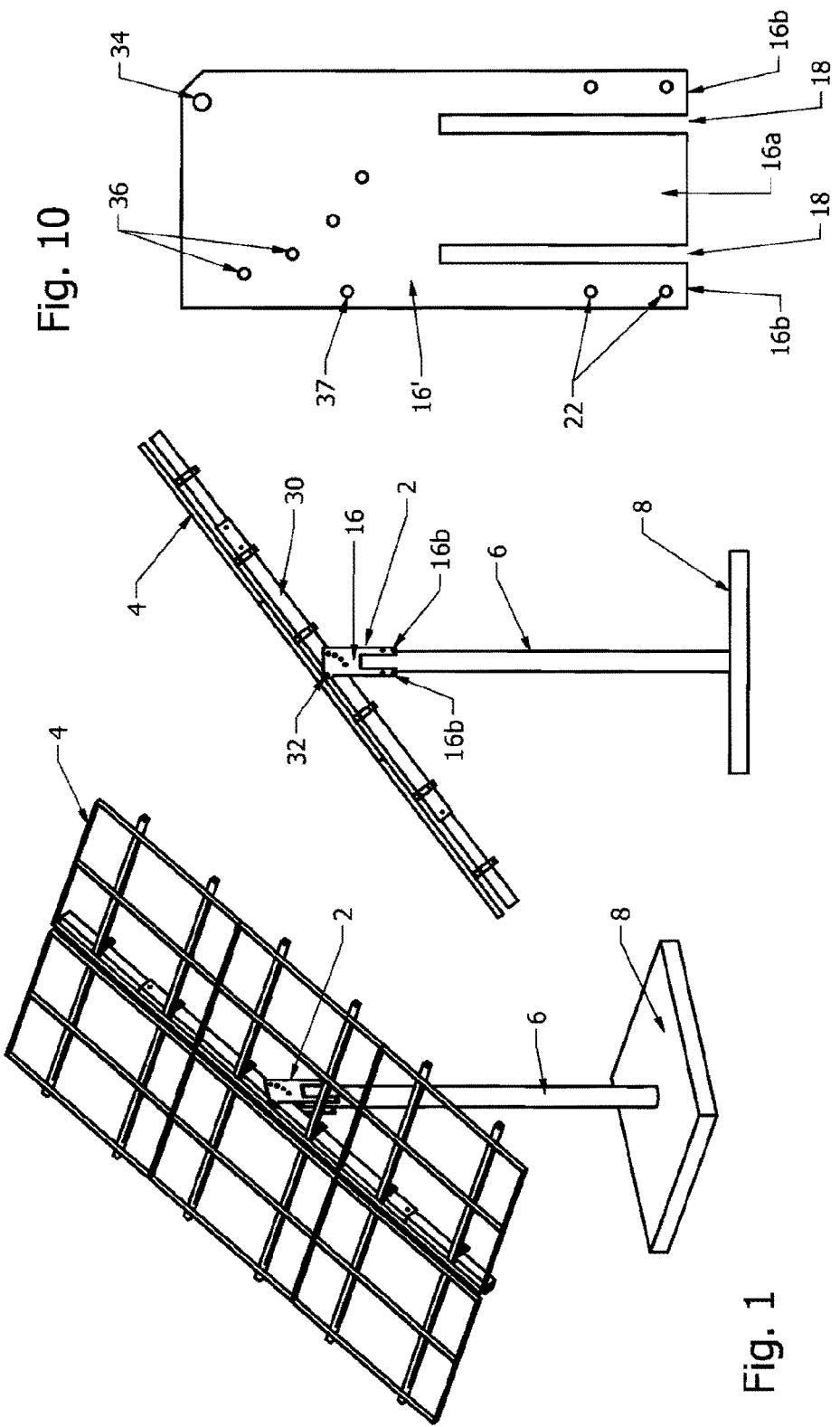

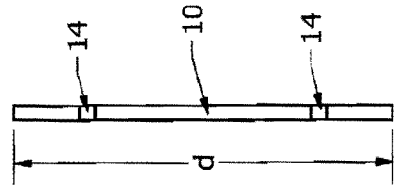
Fig. 9
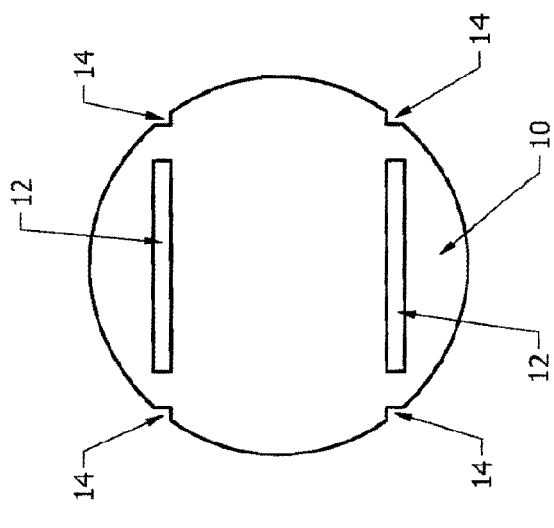
Fig. 8
Fig. 7
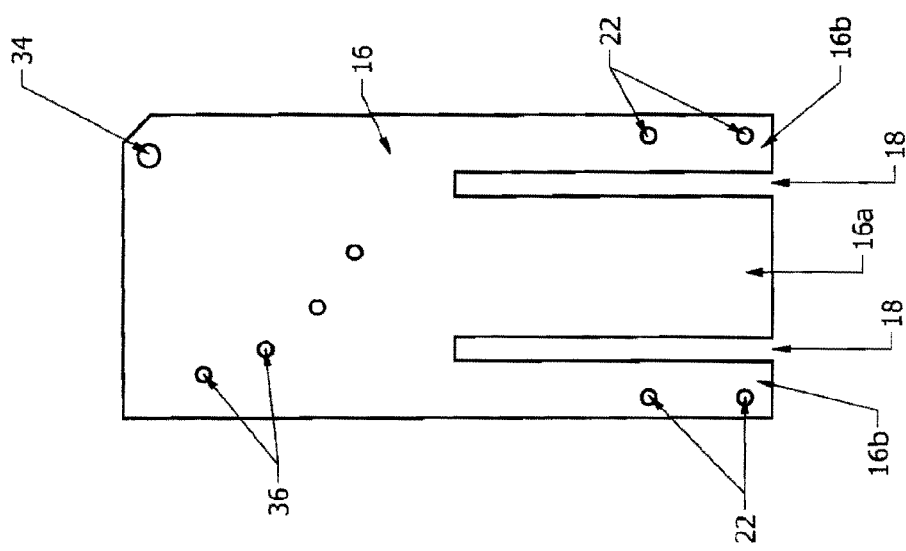
Fig. 6

MOUNTING BRACKET MEANS FOR SOLAR ARRAYS AND THE LIKE

BACKGROUND OF THE INVENTION

1. Field of the Invention

A mounting bracket arrangement for fastening a solar array to a generally vertical support pipe, including a generally horizontal bracket plate seated transversely across the pipe end, and a pair of parallel vertical bracket plates having lower edge portions containing pairs of parallel vertical slots that define center sections that extend into the pipe interior via corresponding slots contained in the horizontal plate, and side sections that extend externally longitudinally of the pipe for connection by external fastening means. A solar array is pivotally connected between the upper portions of the vertical bracket plates for angular adjustment relative to the support pipe.

2. Description of Related Art

Various solar array support systems have been proposed in the prior art, as evidences by the Holmes et al Published Application No. 2010/0139645, and the Barsun et al Published Application No. 2010/0139646. The patents to Nyulassie U.S. Pat. No. 3,802,653, Paulin U.S. Pat. No. 4,706,921, and the Austin et al Published Application No. 2008/0012750 disclose mounting bracket arrangements for fastening antennas to support poles, wherein external legs of the brackets are bolted together.

The present invention was developed to provide an improved adjustable solar array support bracket arrangement that is formed from relatively inexpensive components, quickly assembled with simple tools, requires no welding, is extremely rigid and durable in use, and which is easily adjusted in accordance with the seasons.

SUMMARY OF THE INVENTION

Accordingly, a primary object of the present invention is to provide a mounting bracket arrangement for fastening an object to a generally vertical support member having an upper end portion containing a longitudinal chamber, including a generally horizontal support plate seated transversely across the support member to close the longitudinal chamber, and a pair of parallel vertical bracket plates having corresponding lower edge portions each containing a pair of parallel vertical slots that define a central section and a pair of side sections, the vertical bracket plates being arranged normal to the horizontal support plate such that the center sections extend respectively through corresponding linear openings contained in the horizontal support plate and into the chamber, with the outer sections extending longitudinally externally of the support member. A fastener arrangement connects together the corresponding outer sections of the vertical bracket plates, and the object is connected between the upper portions of the vertical bracket plates.

According to a more specific object of the invention, a solar array includes a longitudinally extending support bar having an intermediate portion extending between the upper portions of the vertical bracket plates. Pivot means connect the support bar intermediate portion for pivotal displacement between said vertical bracket plates, and adjustment means determine the angular position of the support bar and the solar array relative to the vertical support member.

According to another object of the invention, the support member comprises a tubular pipe, and further the horizontal support plate comprises a circular support disk having a diameter that is slightly greater than the outer diameter of said pipe. The circumferential surface of the horizontal support disk contains a pair of stabilizing notches arranged on opposite sides of, and in alignment with, each of the horizontal linear openings, respectively, with the adjacent edges of said vertical bracket side sections extending into said notches, respectively.

BRIEF DESCRIPTION OF THE DRAWINGS

Other objects and advantages of the invention will become apparent from a study of the following specification, when viewed in the light of the accompanying drawing, in which:

FIGS. 1 and 2 are perspective and side elevation views, respectively, of the solar array support system of the present invention;

FIGS. 6 and 7 are front and side elevation views, respectively, of the vertical bracket plate;

FIGS. 8 and 9 are plan and side views of the horizontal bracket plate of FIG. 4; and FIG. 10 is a front elevation view of a modification of the bracket plate of FIG. 6.

DETAILED DESCRIPTION OF THE INVENTION

Referring more particularly to FIGS. 1 and 2, the support bracket means 2 of the present invention serves to rigidly and adjustably mount a solar array 4 on the upper end of a tubular vertical support pipe or pole 6 having a fixed base 8.

Figure 3:
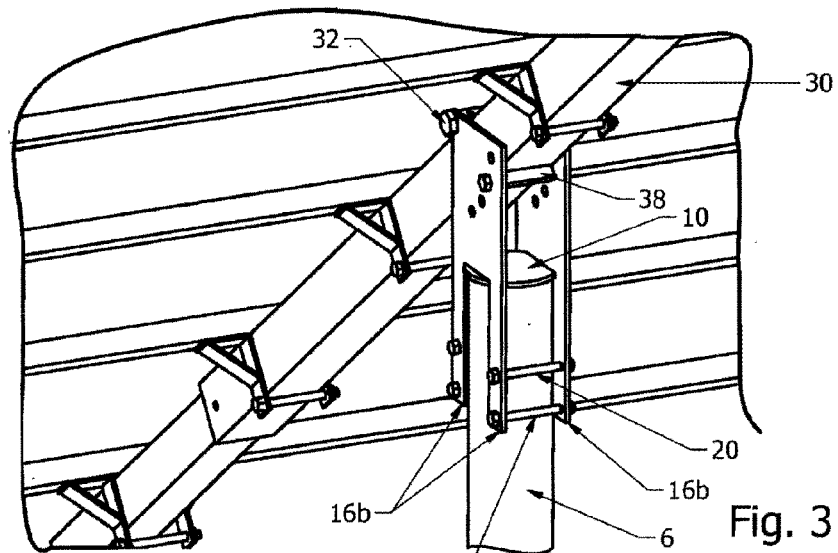
FIG. 3 is a detailed perspective view of the support bracket means of FIGS. 1 and 2.
Figure 4:
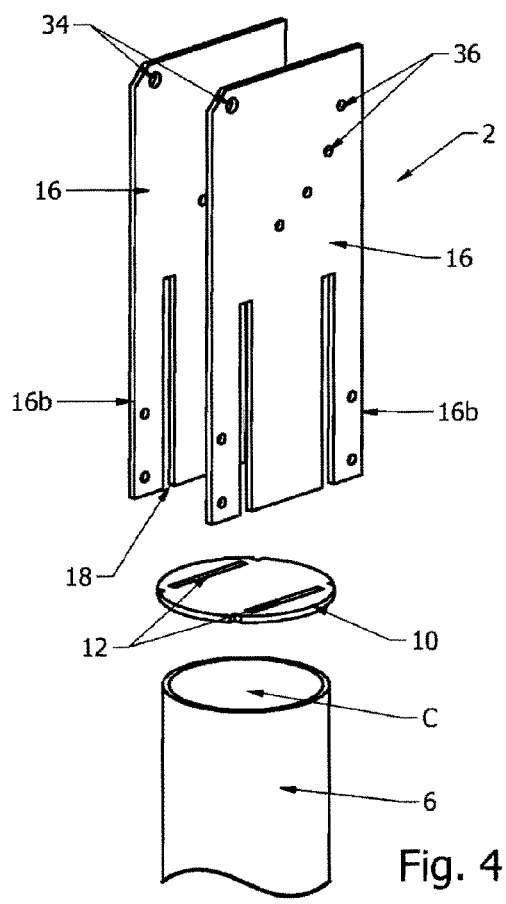
FIG. 4 is an exploded view of the mounting bracket components.
Figure 5:
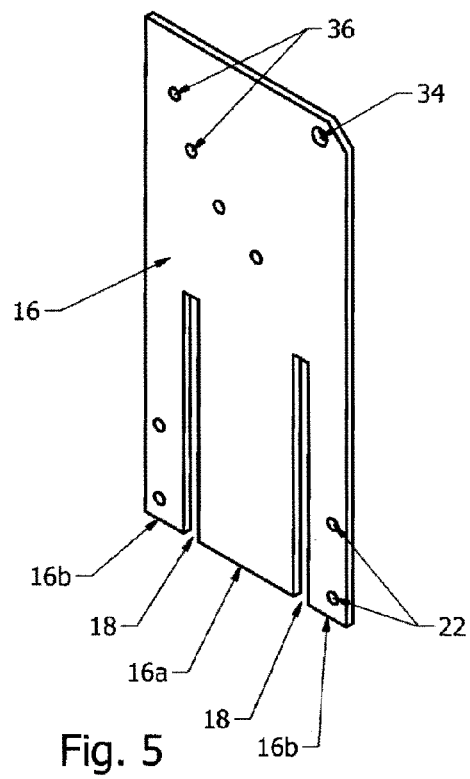
FIG. 5 is a perspective view one of the vertical bracket plates of FIG. 4.

Referring to FIGS. 3-5, it will be seen that the support bracket means includes a horizontal support plate in the form of a circular support disk 10 that is seated on the upper end of the support pipe 6 to close the longitudinal chamber C contained therein. The diameter of the support disk 10 is slightly greater than the outer diameter of the support pipe 6. The circular support disk 10 contains a pair of parallel horizontal linear through openings 12 opposite the chamber C, and the outer circumferential surface of the support disk contains a pair of stabilizing notches 14 in alignment with each of the horizontal linear openings 12, respectively.

Referring to FIGS. 5-7, the support bracket means 2 also includes a pair of parallel planar generally rectangular vertical bracket plates 16 the lower edge portions of which contain a pair of vertical slots 18 that define in each of the vertical bracket plates a center section 16a, and a pair of side sections 16b. When the horizontal support disk 12 is seated on the upper extremity of the pipe 6 as shown in FIG. 3, the vertical brackets 16 of FIG. 4 are displaced downwardly to cause the center sections 16a to extend into chamber C through the horizontal linear openings 12, respectively, Simultaneously, the outer side sections 16b of the vertical bracket plates extend downwardly adjacent the external circumferential surface of the pipe 6, with the adjacent edges of the side sections extending into the stabilizing notches 14 respectively. The side sections of one vertical bracket plate 16 are then bolted to the side sections of the other vertical bracket plate by horizontal Grade 5 nut and bolt means 20 that extend through aligned holes 22 contained in the side sections 16b.

The solar array 4 includes a longitudinal central support bar 30 having an intermediate portion that extends between the upper end portions of the vertical bracket plates 16. A pivot pin 32 extends though aligned openings 34 contained in the vertical bracket plates and though a corresponding opening contained in the central bar support 30. Arranged in a circular arcuate pattern relative to the pivot opening 34 on each of the vertical bracket plates are a plurality of equally-spaced adjustment holes 36 that are operable to selectively receive an adjustment bolt 38 for determining the angular position of the central bar 30 and the solar array relative to the vertical support pipe 6.

In a typical installation for an 8-inch pipe, the horizontal support disk and vertical bracket plates are formed from steel sheet material having a thickness of about 0.375 inches. The diameter of the circular support disk 10 is about 9.13 inches, and the horizontal linear openings 12 have a width of about 0.40 inches, and a length of about 5.5 inches. The vertical brackets bracket plates 16 each have a length of about 23.5 inches, a width of about 11.00 inches, and a thickness of about 0.375 inches. The vertical slots 18 have a width of about 0.94 inches, and a length of about 11.50 inches.

Referring now to FIG. 10, a modification of the vertical bracket plate 16' is shown wherein, as a safety measure, opposed stop openings 37 are provided in the parallel brackets adjacent the adjustment openings 36 for receiving a stop bolt 38a corresponding to the adjustment bolt 38. Thus, as the adjustment bolt 38 is removed to permit angular adjustment of the solar array 4 relative to the support pipe 6, the stop bolt 38a is inserted between the stop openings 37 as a protective measure to prevent tipping of the solar array to a dangerous angular position beyond horizontal.

The bracket assembly of the present invention is easily attached to the support pipe by the use of simple tools and without the requirement of welding. The solar array is easily adjustable in accordance with the seasons by centrally locating the adjustment holes. The bracket plate arrangement is easily expanded to accommodate additional solar panels, thereby providing the user with greater flexibility within a given budget. Owing to the universal solar panel mounting provided by the bracket plate arrangement, solar panels of different manufacturers may be used without the requiring the special ordering of parts. Owing to the high elevation of the pivot axis, the solar assembly is permitted to have a lower center of gravity, and balancing of the array makes seasonable adjustment easier.

While in accordance with the provisions of the Patent Statutes the preferred forms and embodiments of the invention have been illustrated and described, it will be apparent to those skilled in the art that changes may be made without deviating from the invention described above.

What is claimed is:

1. A mounting bracket arrangement for fastening an object to a support member, comprising:
    (a) a generally vertical support member (6) having an upper end portion containing a longitudinal chamber (C);
    (b) a generally horizontal planar transverse support plate (10) seated transversely across said vertical support member upper end portion to close said longitudinal chamber, said transverse support plate containing a pair of parallel horizontal linear openings (12) opposite said chamber;
    (c) a pair of parallel vertical planar rectangular bracket plates (16) having corresponding lower edge portions each containing a pair of parallel linear vertical slots (18) that define a center section (16a) and a pair of side sections (16b), said vertical bracket plates being arranged normal to said transverse support plate such that:
        (1) said center sections extend into said chamber via said horizontal linear openings, respectively; and
        (2) said side sections extend longitudinally externally of said vertical support member; and
    (d) fastener means (20) connecting together said pair of side sections of one vertical bracket plate with corresponding side sections of the other vertical bracket plate.

2. A mounting bracket arrangement as defined in claim 1, wherein said vertical bracket plates have corresponding upper edge portions, and further including:
    (e) a solar array (4) including a longitudinally extending support bar (30) having an intermediate portion extending between said vertical bracket plate upper portions;
    (f) pivot means (32) connecting said support bar intermediate portion for pivotal displacement between a plurality of angular positions relative to said vertical bracket plates; and
    (g) adjustment means (36, 38) for determining a given one angular position of said support bar relative to said vertical support member.

3. A mounting bracket arrangement as defined in claim 2, wherein said pivot means comprises a pivot pin (32) connected between said vertical bracket plate upper portions; and further wherein said adjustment means includes a plurality of adjustment holes (36) contained in said upper portion of each of said vertical bracket plates in a circular pattern relative to said pivot pin, and an adjustment bolt (38) extending between corresponding adjustment holes contained in said vertical bracket plates, respectively.

4. A mounting bracket arrangement as defined in claim 3, wherein said vertical bracket plates contain opposed stop holes (37) adjacent said adjustment holes, said stop holes being arranged to receive a stop bolt extending therebetween to prevent pivoting of the solar array beyond a given position when said adjustment bolt is removed from said adjustment holes.

5. A mounting bracket arrangement as defined in claim 1, wherein said vertical support member comprises a tubular pipe (6) having a given outer diameter; and further wherein said transverse support plate comprises a circular support disk (10) having a diameter that is slightly greater than said pipe outer diameter.

6. A mounting bracket arrangement as defined in claim 5, wherein said circular support disk has a circumferential surface that contains a pair of stabilizing notches (14) arranged on opposite sides of, and in alignment with, each of said horizontal linear openings, respectively, adjacent edges of said vertical bracket side sections extending into said notches, respectively.

* * * * *